US006967700B2

(12) United States Patent
Wang et al.

(10) Patent No.: US 6,967,700 B2
(45) Date of Patent: Nov. 22, 2005

(54) SEQUENTIAL FULL COLOR DISPLAY AND PHOTOCELL DEVICE

(75) Inventors: Dongxue Wang, Lake Zurich, IL (US); Zili Li, Barrington, IL (US); Geroge T. Valliath, Buffalo Grove, IL (US)

(73) Assignee: Motorola, Inc., Schaumburg, IL (US)

( * ) Notice: Subject to any disclaimer, the term of this patent is extended or adjusted under 35 U.S.C. 154(b) by 77 days.

(21) Appl. No.: 10/700,212

(22) Filed: Nov. 3, 2003

(65) Prior Publication Data

US 2005/0094040 A1    May 5, 2005

(51) Int. Cl.[7] .............................................. G02F 1/133
(52) U.S. Cl. ..................................................... 349/116
(58) Field of Search ........................................ 349/116

(56) References Cited

U.S. PATENT DOCUMENTS 5,742,367 A * 4/1998 Kozaki ........................ 349/64

OTHER PUBLICATIONS

Li, Zili, Desai, P., Voloschenko, D., Smith, Matt. "Photovaltaic Cell Integrated Into a Reflective LCD" SID 02 Digest; Hynes Convention Center, Boston, MA. Tuesday May 21, 2002.

* cited by examiner

Primary Examiner—James A. Dudek

(57) ABSTRACT

A full color display and photocell device (100) includes a fast response liquid crystal display (105) that has a rate of at least 75 monochrome frames per second, a transparent panel light (140) behind the fast response LCD that can emit a monochromatic light beam having a selected one of three colors, and a photovoltaic cell (150) behind the transparent panel light that converts light energy emanating from the transparent panel light into electrical energy. The full color display and photocell device (100) may also include a controller (160) that synchronizes information coupled to the fast response LCD and controls the transparent panel light to emit a sequence of monochromatic light beams of three colors.

10 Claims, 1 Drawing Sheet

SEQUENTIAL FULL COLOR DISPLAY AND PHOTOCELL DEVICE

CROSS-REFERENCE TO RELATED APPLICATION

This application is related to a co-pending application entitled "COLOR DISPLAY AND SOLAR CELL DEVICE," U.S. Ser. No. 10/205,458 filed on Jun. 25, 2002, assigned to the assignee of the instant application.

BACKGROUND

As multimedia applications become readily available in cellular telephones and other handheld devices such as personal digital assistants and ebooks, the power drain of the devices increases.

This increase in power drain has put a limit on the use of many applications and is one of the challenges facing cellular handset makers. To combat this problem in cellular telephones with monochrome liquid crystal displays, the integration of a solar panel behind a STN display to collect ambient light energy for either emergency or standby uses has been described, for example, in the technical article "Photovoltaic Cell Integrated into an LCD" published by the Society for Information Display in May, 2002 (Society of Information Display Digest of Technical Papers, Vol XXXIII, No. 1, Page 190–193, Authors: Zili Li, P. Desai, D. Voloschenko, and M. Smith). This supplementary power source is an integrated part of the monochrome display. However, the monochrome display is rapidly being replaced by color displays, so there is a need for supplementary power for telephones and other portable devices with color displays.

BRIEF DESCRIPTION OF THE DRAWINGS

The present invention is illustrated by way of example and not limitation in the accompanying figures, in which like references indicate similar elements, and in which.

DETAILED DESCRIPTION OF THE DRAWINGS

Figure 1:
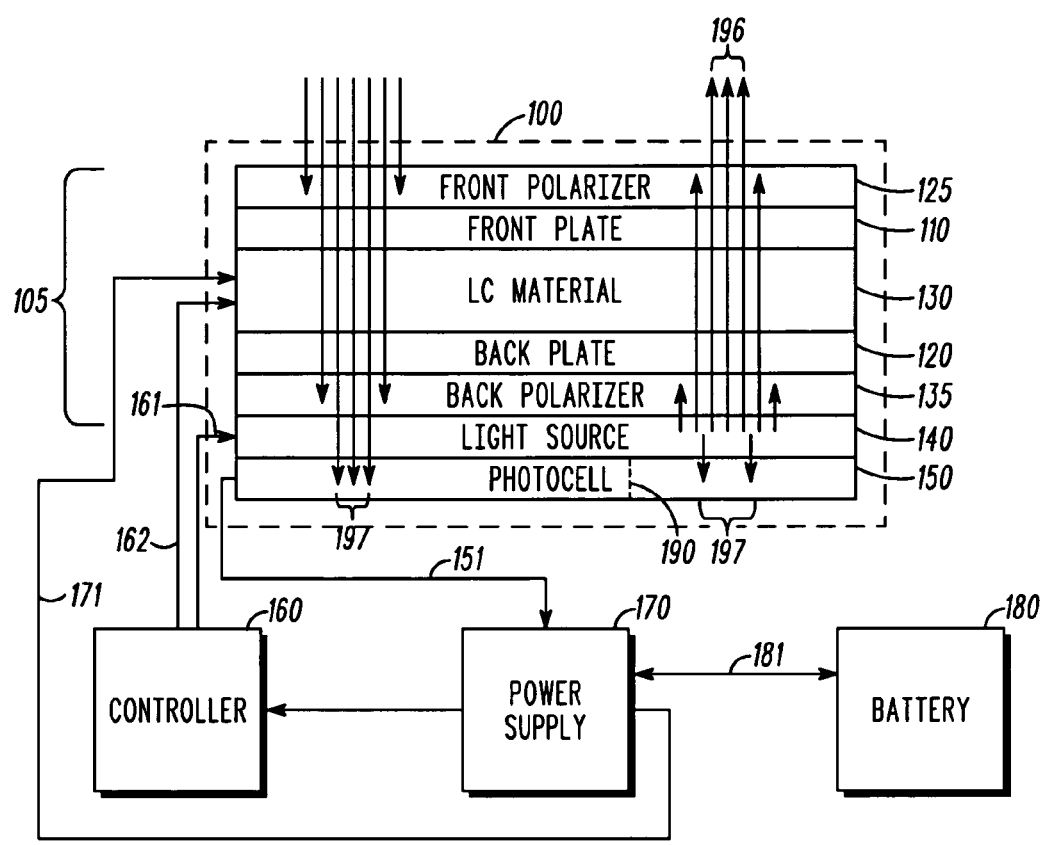
FIG. 1 shows a combined elevation view of an embodiment of a full color display and solar cell device 100 (herein simply referred to as a device 100) and an electrical block diagram of the device 100 and electrical components, in accordance with the present invention Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

Before describing in detail the particular color display and solar cell in accordance with the present invention, it should be observed that the present invention resides primarily in combinations of method steps and apparatus components related to the full color display and solar cell. Accordingly, the apparatus components and method steps have been represented where appropriate by conventional symbols in the drawings, showing only those specific details that are pertinent to understanding the present invention so as not to obscure the disclosure with details that will be readily apparent to those of ordinary skill in the art having the benefit of the description herein.

FIG. 1 shows a combined elevation view of an embodiment of a full color display and solar cell device 100 (herein simply referred to as a device 100) and an electrical block diagram of the device 100 and electrical components, in accordance with the present invention. The device 100 comprises a fast response liquid crystal display (LCD) 105, a transparent panel light source 140 (also called simply a transparent panel light, and a photo cell 150. The fast response LCD 105 (also called simply a liquid crystal display 105) comprises a substantially transparent front plate 110, an opposing substantially transparent back plate 120, fast response liquid crystal material 130, and electrodes (not shown in FIG. 1), and may comprise a front polarizer 125, and a back polarizer 130. The electrodes may be considered an integral part of the front and back plates 110, 120. The phrase "substantially transparent" means that the plate transmits at least 70% of the infrared and visible light energy that is incident on the front plate 110. For example, the front and back plates 110, 120 can be clear glass which is typically at least 96% transmissive to visible light, exclusive of coatings such as the electrodes. Alternatively, the front and back plates 110, 120 can be of substantially transparent plastic, as is well known to one of ordinary skill in the art. Liquid crystal material 130 fills the space between these two plates 110 and 120 in accordance with well-understood prior art knowledge and technique. In this embodiment, the liquid crystal material 130 preferably comprises either supertwisted nematic or twisted nematic liquid crystal material, in which case front and back polarizers are included in the fast response LCD 105, but other liquid crystal material, such as cholesteric material, or polymer dispersed liquid crystal material could be used. When the liquid crystal material 130 is cholesteric, then the fast response LCD 105 does not need to include the front and back polarizers 110, 120. Electrodes, such as transparent contacts (ITO), are placed on the front and back surfaces of LCD material 130 in a manner well known in the art to form a pattern, or array, of liquid crystal pixels between the front plate 110 and the back plate 120 of the fast response LCD 105, which is to say that individual pixels are capable of being electronically controlled by a conventional display control circuit (not shown in FIGS. 1–8) to determine an amount of rotation of linear polarized light passing therethrough, in a well known manner. The LCD 105 may be implemented as an active or passive liquid crystal display. The front polarizer 125 is shown in FIG. 1 as being located in front of the front plate 110. It is preferably a linear polarizer that may be bonded to the front plate. The front polarizer 125 may alternatively be located between the front plate 110 and the liquid crystal material 130. The surface that is at the front of the LCD display is the front side (e.g., front surface of the polarizer 125 when it is in front of the front plate 110). The back polarizer 135 is preferably a linear polarizer, and can be located substantially parallel to and proximate the back plate 120 of the liquid crystal display panel, preferably behind and adjacent to the back plate 120 of the liquid crystal display panel. The back polarizer 135 can alternatively be located between the back plate 120 and the liquid crystal material 130. The surface that is at the back of the fast response LCD 105 is the backside of the fast response LCD 105 (e.g., the backside of the back polarizer 135 when it is behind the rear plate 120). The fast response LCD 105 thus includes the substantially transparent front plate 110, the opposing substantially transparent back plate 120, the liquid crystal material 130, and the electrodes, and may include the polarizers 125, 135 regardless of which liquid crystal material 130 is used, because the polarizers 125, 135 may be added after the fast response LCD 105 is shipped by a fabricator. The fast response LCD 105 may include any number of other items included in conventional display panels, for example, a compensation plate. The fast response LCD 105 is of type that is designed to have a switching delay that is short enough so that one full color frame of information comprising three sub-color frames of monochromatic image information, can be presented at a rate of 25 frames per second with a contrast ratio adequate for an intended ambient light environment, when presented in synchronism with a sequential three color light that is emitted by the transparent panel light source 140. Thus, it can be said that the fast response liquid crystal display (LCD) 105 is rated for at least 75 monochrome frames per second. To further reduce motion artifacts with moving images, a frame rate greater than 60 Hz is often used for a sequential type of full color display. By the same reasoning, the fast response monochromatic liquid crystal display 105 is preferably able to be operated at a sub-color frame rate of at least 180 Hz.

The transparent panel light source 140 is preferably a panel light source that can emit a monochromatic (or narrow band) source of light selected to be one of three primary colors, with a significant portion 196 (e.g., at least approximately 50%, and more preferably, more than 90%) directed through the fast response LCD 105 toward the front of the device 100. It is transparent, such that a substantial percentage (such as at least 50%) of ambient light 197 that is incident on the front of the transparent panel light source 140 passes to the photocell 150, particularly when the light source 140 is off. It is described as a panel light source to emphasize that the light intensity is substantially uniform over the area of the fast response LCD 105. The transparent panel light source 140 may be of any suitable technology that is transparent and provides a sequence of three monochromatic light beams of sufficient intensity to achieve the desired contrast ratio. For example, it may be a light pipe that guides light from a tri-color light, such as three monochromatic light emitters, to the back of the fast response LCD 105. The emitters may, for example, be light emitting diodes, or lasers that emit light from what is essentially one of three point sources (in comparison to the fast response LCD array 106). The light pipe then guides and spreads the light so that it is substantially uniform over the area of the fast response LCD 105.

In an alternative embodiment, the transparent panel light source 140 is implemented using materials that are essentially transparent and that emit light directly from an area equivalent to the area of the fast response LCD array. An example of this type of transparent panel light source 140 would be a tri-color transparent organic light emitting diode panel comprising either stacked transparent red, green, and blue layers of organic light emitting materials and transparent electrodes or a pixelated arrangement of red, green, and blue organic light emitting materials and transparent electrodes.

The photo cell 150 is disposed behind the fast response LCD 105, and a coupling layer 140 joins the photo cell 150 to the transparent panel light source 140, which is likewise coupled to the back of the fast response LCD 105. The coupling layer 140 can be, for example, comprised of an appropriate transparent adhesive material as appropriate to a particular application. If desired, and depending upon the area of the fast response LCD 105 and/or a desired electrical configuration, multiple photo cells 150 can be utilized as suggested by phantom line 190.

The photo cell 150 has a light receiving active surface as understood in the art. For most applications, the appearance of the device 100 will be enhanced if the light receiving active surface has a uniform appearance, typically a dark-colored appearance, and a non-reflecting surface. For most applications, a black or substantially black colored non-reflecting surface will be optimum.

The device 150 may be coupled to a controller 160 and a power supply 170. In some instances the device 150 may be fabricated for sale to include the controller 160 and/or the power supply 170. The controller 160, for example, may comprise a single integrated circuit that includes embedded program instructions and input/output controls lines, may comprise a state machine, or may comprise a combination of portions of conventional microprocessor integrated circuits and other circuits, such as LCD display driver circuits. The controller 160 is coupled to the electrodes of the fast response LCD 105 by signal 161. The electrodes are conventional column and row matrixed electrodes for conducting electrical potentials of the signal 161 that control the transmissivity of each pixel. The controller 160 is also coupled to the transparent panel light source 140 by signal 162, which causes the light source to sequentially generate three essentially monochromatic light beams spread substantially uniformly over the area of the fast response LCD 105, when the fast response LCD 105 is on. The controller 160 synchronizes the video information coupled to the fast response LCD 105 and the sequence of monochromatic light beams of three colors emitted by the transparent panel light source 140 at a rate such that human perception is that of a full color display, such as 25 frames per second, each frame comprising 3 monochrome frames. The video information is organized as three gray scale monochrome frames, each for one of the three colors emitted by the transparent panel light source 140

Whether the fast response LCD 105 is on or off, it will be appreciated that a substantial portion of the light that is incident on the front of the fast response LCD 105 will pass through the polarizers 125, 135, the liquid crystal material 130, the transparent panel light source 140 and the transparent panel light source 140, emanating from the transparent light source 140 and entering the photo cell 150, thereby generating supplemental power that is coupled to the power supply by signal 151. The power is modified as appropriate so that it can be coupled back to the fast response LCD 105 by signal 171 and/or to a battery 180 by signal 181, where it can be stored or distributed to other electronic components that may be in an apparatus that includes the device 100. Examples of such apparatuses are cellular telephones, portable games, personal digital assistants, and other personal electronic apparatuses that run on batteries.

It will be further appreciated that when the fast response LCD 105 is on, a possible leakage of the energy in any light that is emitted by the light source towards the photocell 150 will also emanate 198 from the transparent panel light source 140 and be converted to an electrical potential that can be used to recycle some of the lighting leakages and produce supplemental power. This leakage is preferably less than 10% of the light emitted by the transparent panel light source 140.

A summary of some aspects of the present invention is that it is a full color display and photocell device that includes a liquid crystal display, a transparent panel light source behind the LCD that can emit a monochromatic light beam having a selected one of three colors, and a photovoltaic cell behind the transparent panel light source that converts light energy emanating from the transparent panel light source into electrical energy.

In the foregoing specification, the invention and its benefits and advantages have been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

As used herein, the term "emanate", "emanating", or any other variation thereof, refers to light that transmits through and out of a layer at a first side, or light that is being emitted by the layer out of the first side, or a mixture of both. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. The terms "including" and/or "having", as used herein, are defined as comprising. The term "coupled", as used herein with reference to electro-optical technology, is defined as connected, although not necessarily directly, and not necessarily mechanically.

The term "program", as used herein, is defined as a sequence of instructions designed for execution on a computer system. A "program", or "computer program", may include a subroutine, a function, a procedure, an object method, an object implementation, an executable application, an applet, a servlet, a source code, an object code, a shared library/dynamic load library and/or other sequence of instructions designed for execution on a computer system.

What is claimed is:

1. A full color display and photocell device, comprising:
    a liquid crystal display;
    a transparent panel light behind the LCD that can emit a monochromatic light beam having a selected one of three colors; and
    a photovoltaic cell behind the transparent panel light that converts light energy emanating from the transparent panel light into electrical energy.

2. The full color display and photocell device according to claim 1, wherein the transparent panel light comprises:
    a tri-color light emitter that can emit the monochromatic light beam having a selected one of the three colors; and
    a light pipe that guides light from the sequential tricolor light emitter through the LCD array.

3. The full color display and photocell device according to claim 1, wherein the transparent panel light is a tri-color organic light emitting diode panel array that can emit the monochromatic light beam having a selected one of the three colors.

4. The full color display and photocell device according to claim 1, further comprising a controller that synchronizes information coupled to the LCD and controls the transparent panel light to emit a sequence of monochromatic light beams of three colors.

5. The full color display and photocell device according to claim 1, wherein the LCD is one of a monochromatic twisted nematic LCD, and a monochromatic super twisted nematic LCD, a polymer dispersed liquid crystal display (PDLCD) and a cholesteric LCD.

6. The full color display and photocell device according to claim 1, wherein the light emanating from the transparent panel light comprises at least one of ambient light passing through the LCD and transparent panel light and light emitted by the transparent panel light.

7. The full color display and photocell device according to claim 1, wherein the photocell has a surface adjacent the transparent panel light that is dark and substantially non-reflective.

8. The full color display and photocell device according to claim 1, wherein the LCD is rated for at least 75 frames per second.

9. An electronic apparatus having a full color display and a photocell, comprising:
    a fast response LCD panel;
    a transparent panel light behind the fast response LCD panel;
    a photocell behind the monochromatic fast response LCD panel; and
    a controller that presents color information on the full color display by generating a sequence of monochromatic light beams of three colors emitted by the transparent panel light synchronously with color information coupled to the monochromatic fast response LCD panel at a rate of at least 75 monochrome frames per second, wherein the photocell converts light energy emanating from the transparent panel light into electrical energy.

10. A method for operating a full color display and photocell device, comprising:
    controlling a transparent panel light located behind a fast response LCD rated for at least 75 frames per second to emit a repeated sequence of three monochromatic light beams at a rate of at least 75 per second;
    synchronizing frames of monochromatic information coupled to the fast response LCD to the sequence of three monochromatic light beams; and
    converting light energy emanating from the transparent panel light into electrical energy.

* * * * *